United States Patent
Hiyoshi et al.

(10) Patent No.: US 9,885,292 B2
(45) Date of Patent: Feb. 6, 2018

(54) CONTROL DEVICE FOR COMPRESSION RATIO VARIABLE INTERNAL COMBUSTION ENGINE

(71) Applicant: NISSAN MOTOR CO., LTD., Yokohama-shi, Kanagawa (JP)

(72) Inventors: Ryosuke Hiyoshi, Kanagawa (JP); Sho Ohtsu, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/321,293

(22) PCT Filed: Jun. 27, 2014

(86) PCT No.: PCT/JP2014/067110
§ 371 (c)(1),
(2) Date: Dec. 22, 2016

(87) PCT Pub. No.: WO2015/198462
PCT Pub. Date: Dec. 30, 2015

(65) Prior Publication Data
US 2017/0145929 A1    May 25, 2017

(51) Int. Cl.
*F02B 75/04* (2006.01)
*F02D 15/02* (2006.01)
(Continued)

(52) U.S. Cl.
CPC ............ *F02D 15/02* (2013.01); *F02B 75/045* (2013.01); *F02D 9/08* (2013.01); *F02D 13/0215* (2013.01); *F02D 37/02* (2013.01); *F02P 5/145* (2013.01)

(58) Field of Classification Search
CPC ....... F02B 75/045; F02B 75/047; F02D 15/02
(Continued)

(56) References Cited

U.S. PATENT DOCUMENTS 6,789,515 B1* 9/2004 Marchisseau ........... F02B 75/04
123/48 C
7,174,865 B2* 2/2007 Sakita ................... F02B 75/047
123/197.4
(Continued)

FOREIGN PATENT DOCUMENTS

JP     2013-253512 A    12/2013

*Primary Examiner* — Hung Q Nguyen
(74) *Attorney, Agent, or Firm* — Foley & Lardner LLP

(57) ABSTRACT

A control device for a compression ratio variable internal combustion engine is provided with a compression ratio variable mechanism for changing an engine compression ratio in accordance with a rotational position of a control shaft, and a detection unit that detects an actual compression ratio. In a predetermined engine operating condition such as immediately after an engine start, reference position learning operation for the detection unit is carried out with the control shaft mechanically locked up at a predetermined reference position. During operation of the engine, even when the actual compression ratio is lost or a difference between the actual compression ratio and a target compression ratio becomes greater than an assumed deviation, due to some abnormalities, the reference position learning operation is immediately carried out, thereby enabling a quick return to a state where normal compression ratio control can be carried out.

7 Claims, 3 Drawing Sheets

(51) Int. Cl.
*F02D 13/02* (2006.01)
*F02D 37/02* (2006.01)
*F02D 9/08* (2006.01)
*F02P 5/145* (2006.01)

(58) Field of Classification Search
USPC .................................. 123/48 B, 78 E, 78 F
See application file for complete search history.

(56) References Cited

U.S. PATENT DOCUMENTS

| | | | | |
|---|---|---|---|---|
| 7,506,620 | B2* | 3/2009 | Yasui | ............... F02D 13/0226 |
| | | | | 123/48 R |
| 8,844,479 | B2 | 9/2014 | Hiyoshi | |
| 2005/0216179 | A1* | 9/2005 | Yasui | ............... F01L 13/0021 |
| | | | | 701/115 |
| 2006/0047350 | A1* | 3/2006 | Yasui | ..................... F01L 1/34 |
| | | | | 700/54 |
| 2006/0174854 | A1 | 8/2006 | Yoshizawa | |
| 2006/0180118 | A1 | 8/2006 | Takemura et al. | |
| 2013/0306035 | A1 | 11/2013 | Hiyoshi et al. | |

\* cited by examiner

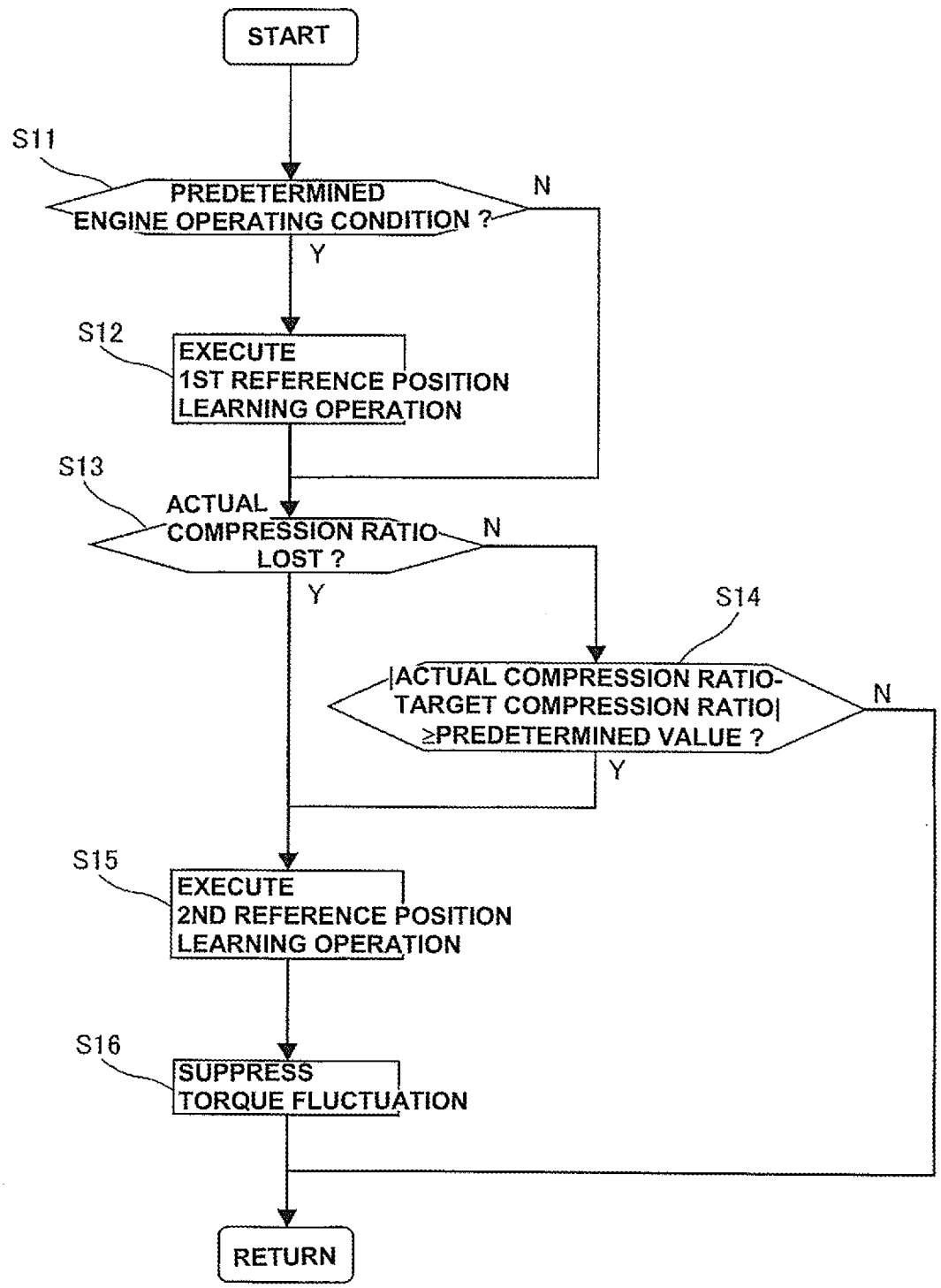

CONTROL DEVICE FOR COMPRESSION RATIO VARIABLE INTERNAL COMBUSTION ENGINE

TECHNICAL FIELD

The present invention relates to a control device for a compression ratio variable internal combustion engine provided with a compression ratio variable mechanism capable of changing an engine compression ratio in accordance with a rotational position of a control shaft.

BACKGROUND ART

Patent document 1 discloses an internal combustion engine (hereinafter referred to as "compression ratio variable internal combustion engine") provided with a compression ratio variable mechanism capable of changing an engine compression ratio in accordance with a rotational position of a control shaft.

CITATION LIST

Patent Literature

Patent document 1: Japanese Patent Provisional Publication No. JP2013-253512

SUMMARY OF INVENTION

Technical Problem

In such a compression ratio variable internal combustion engine, as a compression ratio detection unit that detects an actual compression ratio corresponding to an actual engine compression ratio, for example, a rotation sensor is provided to detect a rotational position of a control shaft corresponding to the actual compression ratio. Also, to ensure the detection accuracy of the compression ratio detection unit, for example, immediately after an engine start or immediately before an engine stop, reference position learning operation (initializing operation), in which a detected value of the compression ratio detection unit is initialized to an initial value corresponding to the reference position, is carried out with the control shaft mechanically locked up at a predetermined reference position.

However, during operation of the engine, when the actual compression ratio is lost due to a communication error or the like, or when a difference between the actual compression ratio and a target compression ratio becomes greater than an assumed deviation due to some abnormalities, the actual compression ratio detected by the compression ratio detection unit becomes unclear or fallen into a state where an error is large. This leads to the difficulty of executing normal engine compression ratio control. As a result of this, there is a possibility that the compression ratio deviates or diverges from an appropriate target compression ratio, thus causing a deteriorated combustion state, consequently, deteriorations in fuel economy, power output, torque, exhaust emissions, noise/vibration performances and the like.

It is, therefore, in view of the previously-described circumstances, an object of the present invention to suppress a deterioration in an engine operating performance to a minimum by virtue of a quick return to a state where the actual compression ratio can be detected normally by the compression ratio detection unit, even when the actual compression ratio is lost or the difference between the actual compression ratio and the target compression ratio becomes greater than an assumed deviation, due to some abnormalities during operation of the engine.

Solution to Problem

The present invention relates to a control device for a compression ratio variable internal combustion engine provided with a compression ratio variable mechanism for changing an engine compression ratio in accordance with a rotational position of a control shaft and configured to control the compression ratio variable mechanism to a target compression ratio set in accordance with an engine operating condition. Also provided is a compression ratio detection unit that detects an actual compression ratio corresponding to an actual engine compression ratio. In a predetermined engine operating condition such as immediately after an engine start or immediately before an engine stop, reference position learning operation (initializing operation), in which a detected value of the compression ratio detection unit is initialized to an initial value corresponding to the reference position, is carried out with the control shaft mechanically locked up at a predetermined reference position.

Also, in the present invention, during operation of the engine, even when the actual compression ratio is lost due to a communication error or the like, or even when a difference between the actual compression ratio and the target compression ratio becomes greater than an assumed deviation due to some abnormalities, the reference position learning operation is carried out.

Advantageous Effects of Invention

According to the present invention, during operation of the engine, when the actual compression ratio is lost due to a communication error or the like, or when a difference between the actual compression ratio and the target compression ratio becomes greater than an assumed deviation due to some abnormalities, the reference position learning operation is promptly carried out, thereby enabling a quick return to an initial state where the actual compression ratio can be detected normally by the compression ratio detection unit. Therefore, even when the actual compression ratio is lost, or even when the difference between the actual compression ratio and the target compression ratio becomes greater than a predetermined value, a quick return to a state where normal compression ratio control can be carried out is realized. Hence, it is possible to suppress a deterioration in an engine operating performance to a minimum.

BRIEF DESCRIPTION OF DRAWINGS

FIG. 3 is a flowchart illustrating a control flow in the embodiment.

DESCRIPTION OF EMBODIMENTS

Figure 1:
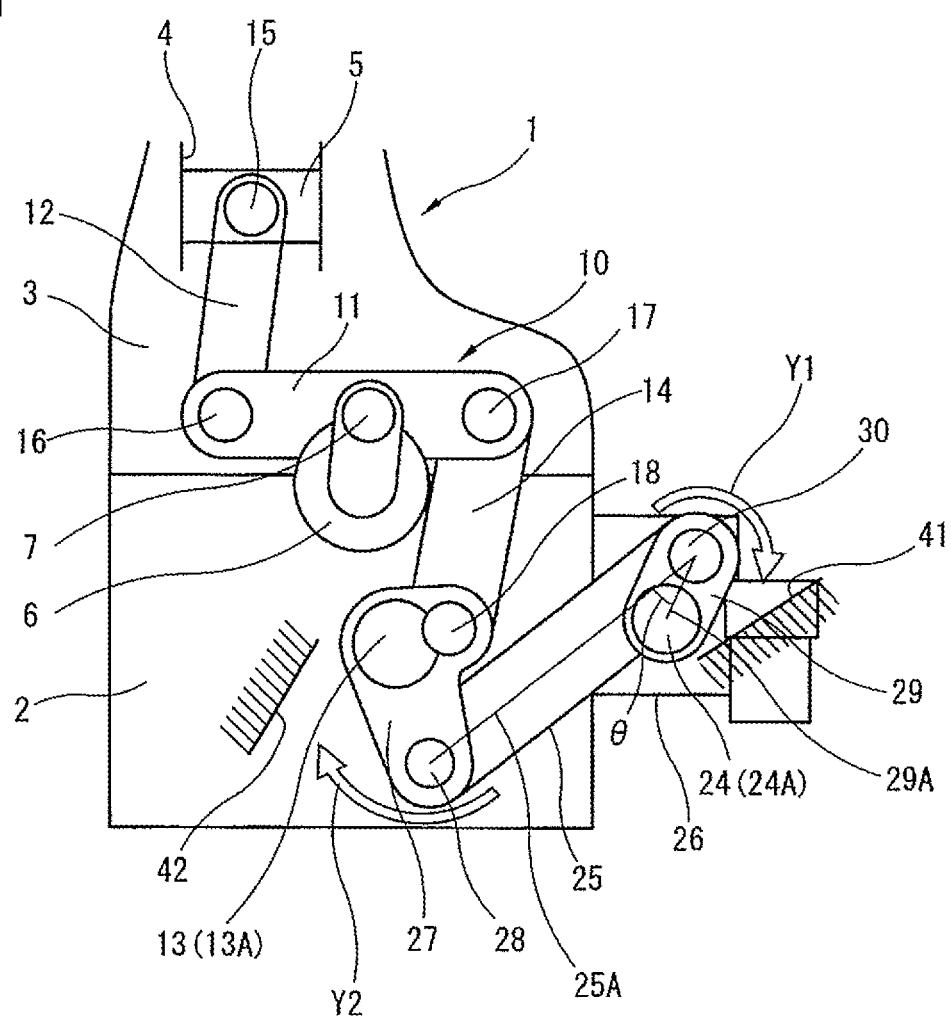
FIG. 1 is a diagram schematically illustrating the configuration of a control device for a compression ratio variable internal combustion engine provided with a compression ratio variable mechanism in one embodiment to which the invention is applied.
Figure 2:
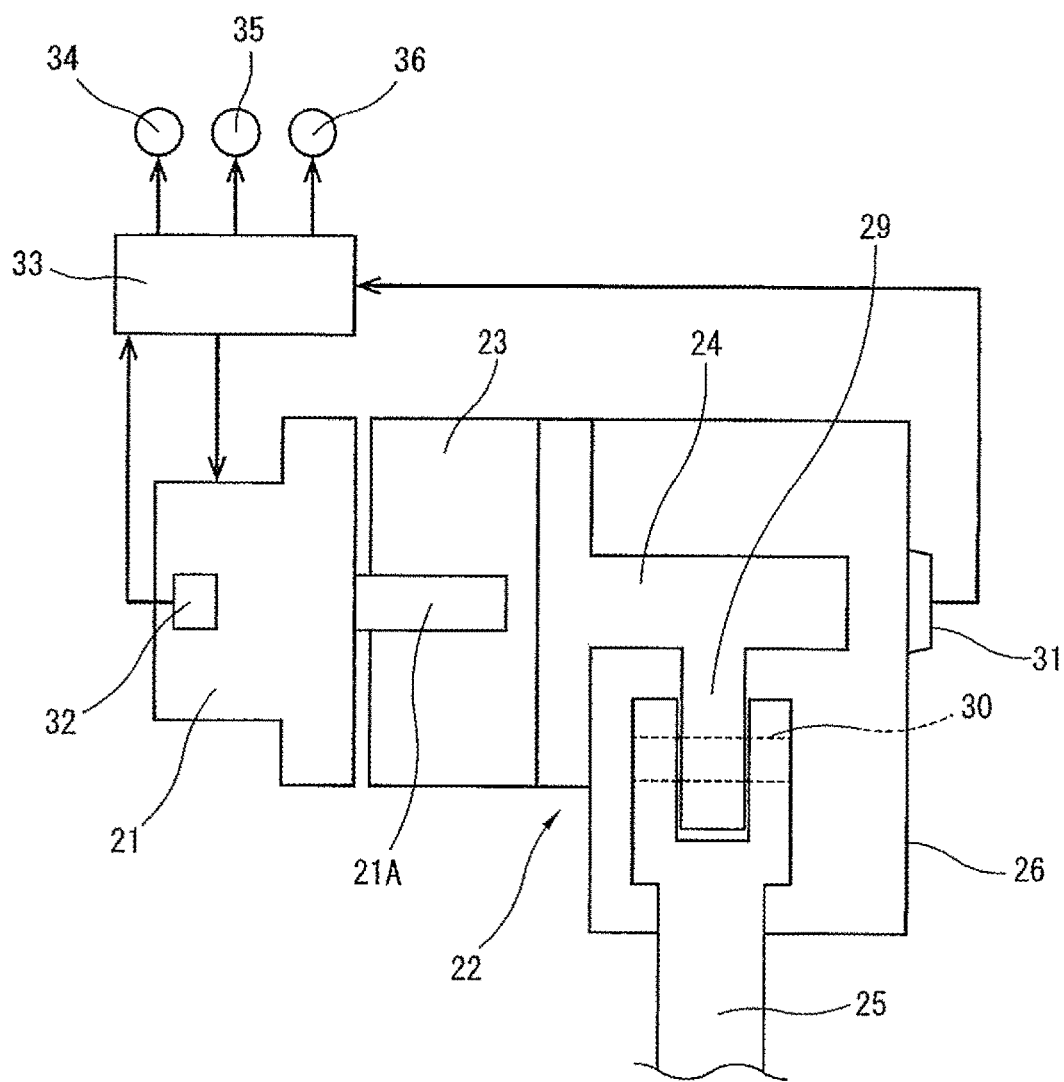
FIG. 2 is a diagram schematically illustrating the configuration of the control device for the compression ratio variable internal combustion engine of the embodiment.

Hereinafter explained in reference to FIGS. 1-3 is a control device for a compression ratio variable internal combustion engine 1 provided with a compression ratio variable mechanism 10 in one embodiment according to the present invention.

With reference to FIG. 1, compression ratio variable internal combustion engine 1 is mainly constructed by a cylinder block 2 serving as an engine body and a cylinder head 3 fixed onto the cylinder block 2. A piston 5 is liftably (slidably) fitted into a cylinder 4 of the cylinder head 3.

Compression ratio variable mechanism 10 has a lower link 11, an upper link 12, a control shaft 13, and a control link 14. The lower link is rotatably installed on a crankpin 7 of a crankshaft 6. The upper link is configured to connect the lower link 11 and the piston 5. The control shaft is rotatably supported on the cylinder block 2. The control link is configured to connect the control shaft 13 and the lower link 11. The upper end of upper link 12 and the piston 5 are connected to each other by means of a piston pin 15 so as to permit relative rotation between them. Upper link 12 and lower link 11 are connected to each other by means of a first connecting pin 16 so as to permit relative rotation between them. Lower link 11 and the upper end of control link 14 are connected to each other by means of a second connecting pin 17 so as to permit relative rotation between them. The lower end of control link 14 is rotatably installed on a control eccentric shaft 18 provided eccentrically to a journal portion 13A serving as the rotation center of control shaft 13.

As shown in FIG. 2, a speed reducing mechanism 22 is interposed in a power-transmission path between the control shaft 13 and an output shaft 21A of a motor 21, serving as an actuator that rotatively drives the control shaft 13, for reducing a rotational power of the output shaft 21A of motor 21 and for transmitting the speed-reduced power to the control shaft 13. Speed reducing mechanism 22 has a speed reducer 23 such as a wave motion gear device that provides high reduction ratios, a rotation shaft 24 that rotates integrally with the output shaft of speed reducer 23, and a lever 25 configured to connect the rotation shaft 24 and the control shaft 13 (see FIG. 1). Rotation shaft 24 is accommodated and arranged inside of a housing 26 fixedly connected to and located alongside the cylinder block 2. The rotation shaft is rotatably supported inside of the housing 26 and arranged parallel to the control shaft 13. Lever 25 is structured to extend through slits of cylinder block 2 and housing 26.

One end of lever 25 and the top end of a first arm 27 extending radially from the journal portion 13A of control shaft 13 are connected to each other by means of a third connecting pin 28 so as to permit relative rotation between them. The other end of lever 25 and the top end of a second arm 29 extending radially from a journal portion 24A serving as the rotation center of rotation shaft 24 are connected to each other by means of a fourth connecting pin 30 so as to permit relative rotation between them.

In the compression ratio variable mechanism 10 constructed as discussed above, when the rotational position of control shaft 13 is changed by means of the motor 21 through the speed reducing mechanism 22, a change in the attitude of lower link 11 occurs and thus a change in stroke characteristic of piston 5 including a piston top dead center (TDC) position and a piston bottom dead center (BDC) position occurs. In this manner, an engine compression ratio is continuously changed.

With reference to FIG. 2, as a compression ratio detection unit that detects an actual compression ratio which is an actual engine compression ratio, a rotation sensor 31 is installed on the housing 26 for detecting a rotational position of rotation shaft 24 corresponding to the actual compression ratio. Also, a motor speed detection sensor 32 is installed on the motor 21 for detecting a motor speed.

A control unit 33 is a digital computer system capable of storing and executing various control processes. The control unit is configured to output control signals to various actuators based on an engine operating condition detected by sensors 31, 32 and the like, for integrally controlling respective operations of these actuators. Concretely, the control unit is configured to control driving of a variable valve timing mechanism 34 capable of changing intake valve timing (or exhaust valve timing), for controlling intake valve open timing (IVO) and intake valve closure timing (IVC). Also, the control unit is configured to control driving of a spark plug 35 that spark-ignites an air-fuel mixture in the combustion chamber, for controlling ignition timing. Furthermore, the control unit is configured to control driving of an electronically-controlled throttle 36 that opens or closes an intake-air passage, for controlling throttle opening.

Additionally, control unit 33 is configured to set a target compression ratio based on the engine operating condition, and feedback-control the operation of motor 21 for maintaining the deviation between the target compression ratio and the actual compression ratio detected by the rotation sensor 31 as small as possible.

As schematically shown in FIG. 1, a rotatable range of each of control shaft 13 and rotation shaft 24, both linked together in a manner so as to rotate in conjunction with each other, is mechanically restricted or limited by means of a low compression ratio side stopper face 41 and a high compression ratio side stopper face 42. For instance, in the shown embodiment, the low compression ratio side stopper face 41 is provided inside of the housing 26. When rotation shaft 24 rotates toward a maximum low compression ratio side (i.e., in the direction indicated by the arrow "Y1" in FIG. 1), a side face of the second arm 29 is brought into abutted-engagement with the low compression ratio side stopper face 41. Hence, control shaft 13 and rotation shaft 24 are structured to be mechanically locked up at a low compression ratio side stopper position. On the other hand, the high compression ratio side stopper face 42 is provided inside of the cylinder block 2. When control shaft 13 rotates toward a maximum high compression ratio side (i.e., in the direction indicated by the arrow "Y2" in FIG. 1), a side face of the first arm 27 is brought into abutted-engagement with the high compression ratio side stopper face 42. Hence, control shaft 13 and rotation shaft 24 are also structured to be mechanically locked up at a high compression ratio side stopper position.

The control contents, which are essential to the embodiment, are explained in detail in reference to the flowchart of FIG. 3. The routine of FIG. 3 is stored in a memory incorporated in the control unit 33, and repeatedly executed every predetermined time intervals, for example 10 milliseconds.

At step S11, a check is made to determine whether or not a predetermined engine operating condition (for example, immediately after an engine start or immediately before an engine stop), in which reference position learning operation (initializing operation) for rotation sensor 31 is carried out, is satisfied. When the predetermined engine operating condition is unsatisfied, the routine proceeds to step S13 (described later), while omitting (skipping) step S12.

In contrast, when the predetermined engine operating condition, in which reference position learning operation should be carried out, is satisfied, the routine proceeds to step S12, at which a first reference position learning operation is carried out. In this first reference position learning operation, in a specified state where, with the rotation shaft 24 in abutted-engagement with the low compression ratio side stopper face 41, control shaft 13 as well as rotation shaft 24 has been mechanically locked up at the low compression ratio side stopper position serving as a reference position, a detected value of rotation sensor 31, corresponding to an actual compression ratio, is learned and initialized to a given initial value corresponding to the reference position. By virtue of the learning and initializing operation, the correspondence relation between an actual rotational position of each of control shaft 13 and rotation shaft 24 and an actual compression ratio detected by rotation sensor 31 can be reset to an initial normal state.

By the way, in the shown embodiment, in the previously-discussed first reference position learning operation, the low compression ratio side stopper position, at which rotation shaft 24 has been brought into abutted-engagement with the low compression ratio side stopper face 41, is used as a reference position. In lieu thereof, the high compression ratio side stopper position, at which control shaft 13 has been brought into abutted-engagement with the high compression ratio side stopper face 42, may be used as a reference position.

At step S13, a check is made to determine whether or not the control unit 33 has lost an actual compression ratio detected by rotation sensor 31 for some reasons such as a communication error or the like. Also, at step S14, a check is made to determine whether or not an abnormal state where a difference between the actual compression ratio and a target compression ratio is greater than or equal to a predetermined value is present. When the answer to step S13 and the answer to step S14 are both negative (NO), that is, when the actual compression ratio is not lost and a normal state where the difference between the actual compression ratio and the target compression ratio is less than the predetermined value is present, one execution cycle of the routine terminates, skipping both steps S15, S16 (described later).

In contrast, when at least one of the answer to step S13 and the answer to step S14 is positive (YES), that is, when the actual compression ratio is lost or an abnormal state where the difference between the actual compression ratio and the target compression ratio is greater than or equal to the predetermined value is present, steps S15 and S16 are executed in that order. At step S15, a second reference position learning operation is carried out. In this second reference position learning operation, in a similar manner to the previously-discussed first reference position learning operation, in a specified state where, with the rotation shaft 24 in abutted-engagement with the low compression ratio side stopper face 41, control shaft 13 as well as rotation shaft 24 has been mechanically locked up at the low compression ratio side stopper position serving as a reference position, a detected value of rotation sensor 31 is learned and initialized to a given initial value corresponding to the reference position. By virtue of the learning and initializing operation, the correspondence relation between a detected value of detection sensor 31 and a rotational position of each of control shaft 13 and rotation shaft 24 can be returned to an initial normal state.

Subsequently to the above, at step S16, in order to absorb or cancel a torque fluctuation, caused by an engine compression ratio fluctuation occurring owing to execution of the reference position learning operation, torque fluctuation suppressing operation is carried out. Concretely, according to rotation of control shaft 13 as well as rotation shaft 24 toward the low compression ratio side stopper position serving as a reference position, a change in the engine compression ratio toward the low compression ratio side occurs, and thus a drop in engine output torque occurs. Therefore, to compensate the engine output torque drop, torque increase control, in which the engine output torque is increased, is executed. For instance, at least one of an advance in intake valve closure timing attained by variable valve timing mechanism 34, an advance in ignition timing of spark plug 35, and an increase in throttle opening of the electronically-controlled throttle 36 is performed.

The specified configuration of the embodiment and its operation and effects are hereunder enumerated.

(1) When the actual compression ratio is lost due to a communication error or the like, or when the difference between the actual compression ratio and the target compression ratio deviates or diverges greater than an assumed deviation due to some abnormalities, there is a possibility that a large error is generated or included in the actual compression ratio detected by the rotation sensor 31. Thus, when the actual compression ratio greatly deviates toward the high compression ratio side, there is a possibility that the piston 5 excessively approaches the valves, knocking occurs, and/or abnormal noise occurs owing to collision-contact of control shaft 13 with the stopper face 42 or collision-contact of rotation shaft 24 with the stopper face 41. By the way, in a normal state where compression ratio control is executed normally, the control is made so as not to bring the control shaft 13 and the rotation shaft 24 into collision-contact with respective stopper faces 42, 41. In contrast, when the actual compression ratio greatly deviates toward the low compression ratio side, there is a possibility that the combustion state deteriorates, and thus several engine performances, such as fuel economy, power output, torque, exhaust emissions, noise/vibration performances and the like tend to deteriorate.

Therefore, in the shown embodiment, when the actual compression ratio is lost, or when the difference between the actual compression ratio and the target compression ratio deviates or diverges greater than an assumed deviation due to some abnormalities, the second reference position learning operation is immediately carried out. Hence, the correspondence relation between a detected value of detection sensor 31 and an actual rotational position of each of control shaft 13 and rotation shaft 24 can be returned to a normal state. Therefore, by virtue of a quick return of rotation sensor 31 to its normal initial state, it is possible to eliminate or solve, in a short time, such a state where an error in the actual compression ratio is large and thus normal compression ratio control cannot be carried out, thereby suppressing a deterioration in an engine operating performance, such as fuel economy, power output, torque and the like, to a minimum.

(2) When carrying out the reference position learning operation owing to a loss of the compression ratio or owing to the difference between the actual compression ratio and the target compression ratio diverging greater than an assumed deviation, preferably, as previously explained in the shown embodiment, in a specified state where the rotation shaft 24 has been brought into abutted-engagement with the low compression ratio side stopper face 41, that is, in a specified state where control shaft 13 as well as rotation shaft 24 has been mechanically locked up at the low compression ratio side stopper position, the reference position learning operation is carried out.

The reason for this is hereunder explained. A moment, caused by combustion load and inertial load, acts on the rotation shaft 24 in the rotation direction "Y1" directed toward the low compression ratio side. Therefore, even during high load operation at which large combustion load is applied, or even during high speed operation at which large inertial load is applied, rotation shaft 24 can be certainly and promptly rotated toward the low compression ratio side stopper position serving as a reference position by the aid of the combustion load and the inertial load, and thus the reference position learning operation can be promptly carried out.

Additionally, by virtue of setting of the reference position to the low compression ratio side, it is possible to more certainly suppress knocking from occurring. Hence, for the purpose of avoiding the occurrence of knocking, it is unnecessary to limit an engine output (an engine load).

(3) In a specified state where, with the rotation shaft 24 brought into abutted-engagement with the low compression ratio side stopper face 41, control shaft 13 as well as rotation shaft 24 has been mechanically locked up at the low compression ratio side stopper position, the rotation shaft 24 is positioned within a predetermined angular range containing a rotational position such that torque about the rotation shaft 24, which torque is transmitted from the control shaft 13 through the lever 25 to the rotation shaft 24, becomes a minimum.

Hence, even when the reference position learning operation is carried out during high load operation at which large combustion load is applied or during high speed operation at which large inertial load is applied, it is possible to sufficiently suppress the moment acting on the rotation shaft 24, thereby suppressing collision noise, which may occur owing to collision-contact of the rotation shaft 24 with the low compression ratio side stopper face 41, and suppressing the occurrences of abrasion and impression.

(4) By the way, structurally, the torque about the rotation shaft 24, transmitted from the control shaft 13 through the lever 25 to the rotation shaft 24, tends to decrease, as the angle θ between the link centerline 25A of lever 25 (i.e., the line segment connecting the center of the third connecting pin 28 and the center of the fourth connecting pin 30) and the link centerline 29A of the second arm 29 (i.e., the line segment connecting the center of the journal portion 24A of rotation shaft 24 and the center of the fourth connecting pin 30) decreases. For the above reason, in a specified state where control shaft 13 as well as rotation shaft 24 has been mechanically locked up at the low compression ratio side stopper position, the rotation shaft 24 is positioned within a predetermined angular range containing a specified position at which the angle θ becomes a minimum (in other words, when the link centerline 25A and the link centerline 29A are brought into line with each other). As recited in the item (3), even when the reference position learning operation is carried out during high load operation at which large combustion load is applied or during high speed operation at which large inertial load is applied, it is possible to sufficiently suppress the moment acting on the rotation shaft 24, thereby suppressing collision noise, which may occur owing to collision-contact of the rotation shaft 24 with the low compression ratio side stopper face 41, and suppressing the occurrences of abrasion and impression.

(5) When carrying out the second reference position learning operation owing to a loss of the actual compression ratio, according to rotation of control shaft 13 as well as rotation shaft 24 toward the reference position, the engine compression ratio changes. Owing to such a change in the engine compression ratio, a change (a fluctuation) in engine output torque occurs. Such a state would be likely to cause the vehicle occupants to feel discomfort. Therefore, in the shown embodiment, in order to absorb or cancel a torque fluctuation, caused by an engine compression ratio change occurring owing to the reference position learning operation, control actions for valve timing, ignition timing, and/or throttle opening are controlled.

(6) Concretely, as previously explained in the shown embodiment, in the case that control shaft 13 and rotation shaft 24 are rotated in the low-compression-ratio direction by movement of the rotation shaft toward the low compression ratio side stopper face 41 when carrying out the second reference position learning operation, in order to absorb or cancel a torque drop caused by a drop in the engine compression ratio, at least one of an advance in ignition timing, an advance in intake valve closure timing, and an increase in throttle opening is performed. Hence, it is possible to suppress a torque fluctuation occurring owing to execution of the second reference position learning operation, thereby improving the driveability.

While the foregoing is a description of the preferred embodiments carried out the invention, it will be understood that the invention is not limited to the particular embodiments shown and described herein, but that various changes and modifications may be made. For instance, as a compression ratio detection unit, in the shown embodiment, rotation sensor 31 that detects a rotational position of rotation shaft 24 is used. In lieu thereof, another configuration such that detects a rotational position of control shaft 13 may be used, or a further configuration that directly detects or estimates a piston position (a stroke position) of piston 5 may be used. In the shown embodiment, the low compression ratio side stopper face 41 is provided on the side of rotation shaft 24 and housing 26, whereas the high compression ratio side stopper face 42 is provided on the side of control shaft 13 and cylinder block 2. The invention is not limited to this stopper arrangement. In lieu thereof, these two stopper faces may be both provided on the side of rotation shaft 24 and housing 26 or on the side of control shaft 13 and cylinder block 2.

The invention claimed is:

1. A control device for a compression ratio variable internal combustion engine provided with a compression ratio variable mechanism for changing an engine compression ratio in accordance with a rotational position of a control shaft and configured to control the compression ratio variable mechanism to a target compression ratio set in accordance with an engine operating condition, comprising:
    a compression ratio detection unit that detects an actual compression ratio corresponding to an actual engine compression ratio;
    a first reference position learning means for carrying out reference position learning operation for the compression ratio detection unit with the control shaft mechanically locked up at a predetermined reference position in a predetermined engine operating condition; and
    a second reference position learning means for carrying out the reference position learning operation, during operation of the engine, when the actual compression ratio is lost or when a difference between the actual compression ratio and a target compression ratio becomes greater than a predetermined value.

2. A control device for a compression ratio variable internal combustion engine as recited in claim 1, wherein:
    the second reference position learning means is configured to carry out the reference position learning operation in a specified state where the control shaft has been rotated toward a maximum low compression ratio side and locked up at a low compression ratio side stopper position.

3. A control device for a compression ratio variable internal combustion engine as recited in claim 2, which further comprises:
an actuator configured to rotatively drive the control shaft; and
a speed reducing mechanism for reducing a rotational power of the actuator and for transmitting the speed-reduced power to the control shaft,
wherein the speed reducing mechanism has a rotation shaft linked through a lever to the control shaft, and
wherein, in the specified state where the control shaft as well as the rotation shaft has been locked up at the low compression ratio side stopper position, the rotation shaft is positioned within a predetermined angular range containing a rotational position such that torque about the rotation shaft, which torque is transmitted from the control shaft through the lever to the rotation shaft, becomes a minimum.

4. A control device for a compression ratio variable internal combustion engine as recited in claim 2, which further comprises:
an actuator configured to rotatively drive the control shaft; and
a speed reducing mechanism for reducing a rotational power of the actuator and for transmitting the speed-reduced power to the control shaft,
wherein the speed reducing mechanism has a rotation shaft linked through a lever to the control shaft,
wherein one end of the lever is rotatably connected to a top end of a first arm extending radially from the control shaft, while the other end of the lever is rotatably connected to a top end of a second arm extending radially from the rotation shaft, and
wherein, in the specified state where the control shaft as well as the rotation shaft has been locked up at the low compression ratio side stopper position, the rotation shaft is positioned within a predetermined angular range containing a position such that an angle between a link centerline of the lever and a link centerline of the second arm becomes a minimum.

5. A control device for a compression ratio variable internal combustion engine as recited in claim 1, which further comprises:
a variable valve timing mechanism that changes timing of an intake valve or an exhaust valve;
a spark plug that spark-ignites an air-fuel mixture fed into a combustion chamber;
an electronically-controlled throttle that opens or closes an intake-air passage; and
a torque fluctuation suppressing means for controlling at least one of the valve timing, ignition timing of the spark plug, and throttle opening of the electronically-controlled throttle, in order to absorb a torque change, caused by an engine compression ratio change occurring owing to the reference position learning operation carried out by the second reference position learning means.

6. A control device for a compression ratio variable internal combustion engine as recited in claim 2, which further comprises:
a variable valve timing mechanism that changes valve timing of an intake valve or an exhaust valve;
a spark plug that spark-ignites an air-fuel mixture fed into a combustion chamber;
an electronically-controlled throttle that opens or closes an intake-air passage; and
a torque fluctuation suppressing means for performing at least one of an advance in intake valve closure timing, an advance in ignition timing of the spark plug, and an increase in throttle opening of the electronically-controlled throttle, in order to absorb a torque drop, caused by an engine compression ratio drop occurring owing to the reference position learning operation carried out by the second reference position learning means.

7. A control device for a compression ratio variable internal combustion engine as recited in claim 1, wherein:
the compression ratio variable mechanism comprises:
a lower link rotatably installed on a crankpin of a crankshaft;
an upper link that connects the lower link and a piston of the internal combustion engine; and
a control link that connects the control shaft and the lower link.

* * * * *